Aug. 29, 1933. A. P. WILLIAMSON 1,924,173
STEM FOR PNEUMATIC TIRES OR THE LIKE
Filed Oct. 8, 1932
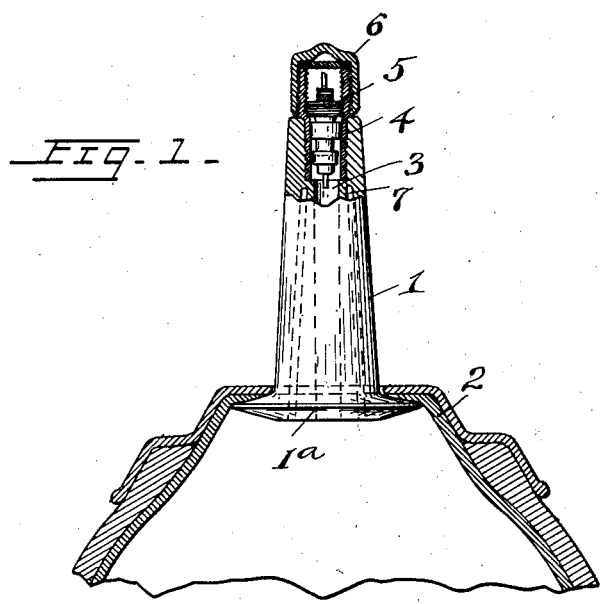
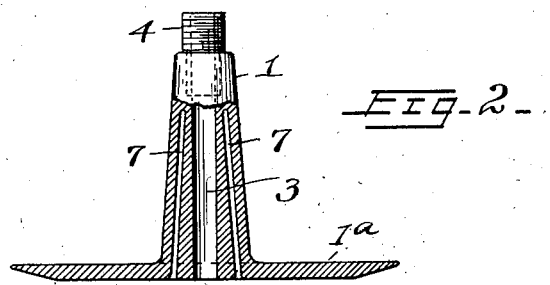
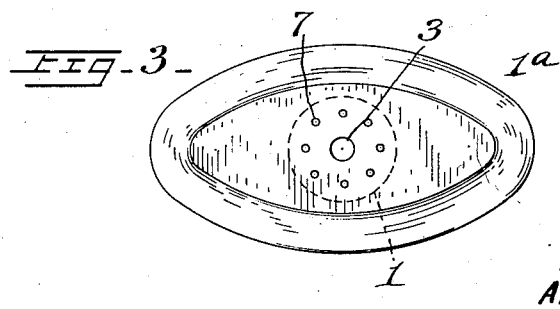
INVENTOR
ARTHUR P. WILLIAMSON.

Patented Aug. 29, 1933

1,924,173

UNITED STATES PATENT OFFICE 1,924,173

STEM FOR PNEUMATIC TIRES OR THE LIKE

Arthur P. Williamson, Shaker Heights, Ohio, assignor to The Dill Manufacturing Company, Cleveland, Ohio, a Corporation of Ohio Application October 8, 1932. Serial No. 636,798

3 Claims. (Cl. 152—12)

The present invention relates to valve stems such as are used in connection with inner tubes for pneumatic tires or other inflatable devices.

It has been common practice in this art to use a metal valve stem in connection with the inner tube of a tire, which metal valve stem has been secured to the inner tube by certain mechanical devices. Such a valve stem has also been provided with retaining means, so that when the valve stem was inserted through the usually provided hole in a wheel rim, the valve stem was, in effect, secured upon the rim, so that it could not be pulled through.

When an inner tube becomes punctured and, particularly in the case of an inner tube used in connection with a tire upon what is known as a drop-center rim, there is a marked force exerted upon the valve stem, tending to pull the valve stem through the hole in the rim and inside the shoe of the tire, this being because there is a tendency for the inner tube to creep with respect to the enclosing shoe. With the valve stem fastened or secured upon the rim, obviously the stem cannot pull through the rim, and hence it has frequently happened that the rubber of the inner tube in the vicinity of the place where the valve stem is attached thereto, has become torn and thus ruined the inner tube.

It is, therefore, as a practical proposition, impossible to permit a metal valve stem to be drawn within the casing of a tire when the inner tube becomes deflated, because if the metal stem is drawn into the casing, just a few rotations of the wheel upon which the tire is mounted, would be sufficient to cause the metal stem to cut the inner tube and destroy its further usefulness.

It has been heretofore proposed to use a rubber valve stem which could be suitably vulcanized to the inner tube, with provision of a metal ferrule at the outer end of the rubber stem, suitably prepared to receive a valve insides and the usual valve cap. A stem of this character even if pulled within the shoe or casing of the tire, when an inner tube becomes punctured, would not do any damage to the rubber of the inner tube, such as would be effected by the metal valve stem if it were allowed to be pulled within the casing when the inner tube became punctured or otherwise deflated.

One of the difficulties in connection with the use of a rubber valve stem is that the very nature of the material is such as to make it difficult to provide the necessary and desirable rigidity in the stem when in its usual functioning position with the inner tube under inflation, and the purpose of the present invention is to provide a construction for a rubber valve stem or a valve stem made of similar flexible material, which will give the proper and desired rigidity to the valve stem.

Reference should be had to the accompanying drawing forming a part of this specification in which, Fig. 1 is a section with portions in elevation showing a part of a casing, a wheel rim and a stem embodying the present invention, Fig. 2 is a sectional elevation of the stem, Fig. 3 is a bottom plan view of the stem.

The stem 1 is made of rubber or suitable flexible material, which is vulcanized or otherwise suitably secured to an inner tube. This stem is provided with a central air passage 3, and at its outer end has a ferrule 4 which is molded into the end of the stem or otherwise secured. This ferrule is interiorly threaded to receive the usual valve insides 5, and the ferrule is threaded upon its exterior surface to receive a valve cap 6.

Formed as a part of the stem are a plurality of smaller passageways 7, which are arranged to extend parallel with the central passageway 3 but are unconnected therewith. These passageways 7 open out upon the underside of the stem, which stem, for purposes of securing it to the inner tube, is provided with an extended portion 1ª.

The number of such passageways 7 may be varied and the arrangement of these passageways with respect to the central air passage 3 is clearly shown in Fig. 3.

When such a valve stem as has been described is used in connection with an inner tube, and the inner tube is placed under inflation, the air pressure which is extant in the inner tube will also exist in the passageway 3 and the passageways 7 of the stem 1. The presence of the air under pressure in the various passageways will materially stiffen the valve stem against any bending action and so will make such a stem more practical in use than the simple rubber stem could possibly be.

Of course, it will be understood that when a rubber valve stem is used and the inner tube is under inflation, a stiff or practically rigid valve stem is desirable, inasmuch as it obviates any bending or giving of the stem, which would tend to pull the stem within the casing of the tire, due to a tendency of the inner tube to creep when an inflated tire is mounted on a moving vehicle.

Furthermore, it will be apparent that a rubber or flexible valve stem as herein described can be so constructed as to be less rigid, when the tire is deflated, to thus enhance the possibilities of its being drawn within the casing if a puncture or other deflation of the tube occurs, while at the same time providing the desired rigidity or stiffness when the tire is in its inflated condition.

It is obvious that various changes may be made departing from the precise construction herein shown and described without departing from the spirit of the invention.

Having thus described my invention what I claim as new is:

1. A valve stem made of flexible material and having a central air passageway, said stem being provided with air pockets adapted to receive compressed air when the stem is used upon an inflated article.

2. A valve stem made of flexible material and having a central air passageway, said stem having a plurality of elongated air chambers adapted to receive compressed air and so stiffen the stem when the stem is used on an inflated article.

3. A valve stem made of flexible material and having a central air passageway, said stem having a plurality of elongated air pockets extending generally parallel with the said central air passage and adapted to receive air under compression when the valve stem is used with an inflated article.

ARTHUR P. WILLIAMSON.